Oct. 22, 1929.  W. L. MARDEN  1,732,689
METER
Filed Aug. 30, 1928
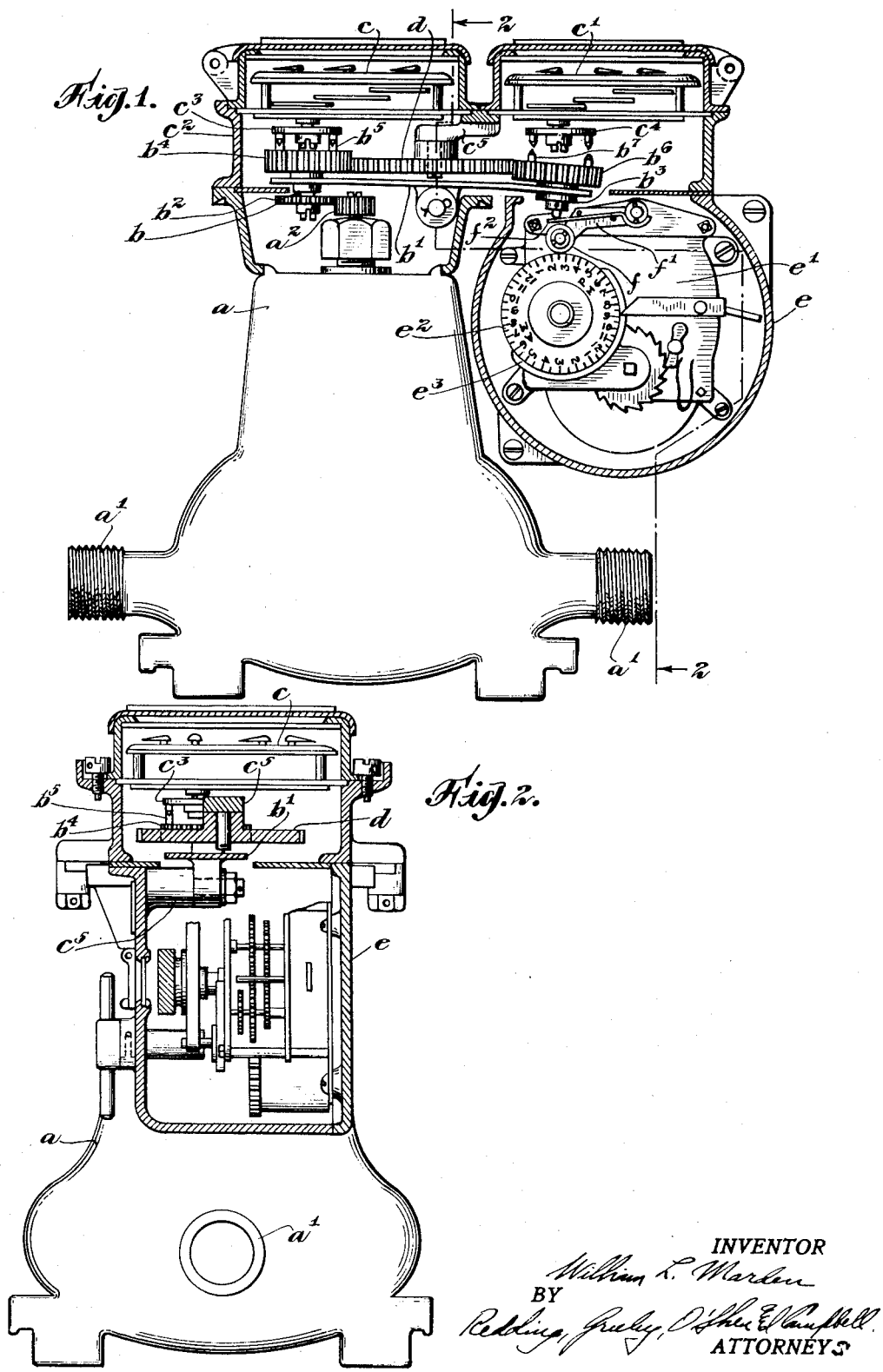

Patented Oct. 22, 1929

1,732,689

UNITED STATES PATENT OFFICE

WILLIAM L. MARDEN, OF ELMHURST, NEW YORK, ASSIGNOR TO NEPTUNE METER COMPANY, OF NEW YORK, N. Y., A CORPORATION OF NEW JERSEY

METER

Application filed August 30, 1928. Serial No. 302,989.

In the copending application of William L. Marden, Serial No. 299,015, filed August 11, 1928, for meters, there is described a meter and registering device to record the flow of a fluid during certain predetermined hours of a day. The mechanism used includes a plurality of recording devices driven by a meter, suitable timing mechanism being provided to control the drive of one of the recording mechanisms to connect and disconnect it during predetermined periods of time.

The present invention embodies an improved construction which includes the meter and recording mechanisms utilized in the above mentioned construction, but is provided with a different mechanism for driving the recording devices from the meter. More specifically, the invention includes a transmission between the meter and recording mechanisms which may be selectively engaged with either of the recording mechanisms by a time controlled device. When one of the recorders is inactive, the other is functioning and the aggregate of the readings indicates the total amount of fluid used. By constructing the time controlled mechanism in a suitable manner, one of the recorders may serve to indicate that portion of the total fluid which is used between certain hours, and the other recorder for indicating the remaining fluid flow.

The invention will be understood more fully in connection with the accompanying drawings, wherein:

Figure 1 is a view in elevation, partly in section, showing the improved manner of driving the recorders selectively by means of the time controlled mechanism.

Figure 2 is a view in section, taken on line 2—2 of Figure 1, and looking in the direction of the arrows.

Referring to the above drawings, $a$ indicates a meter provided with inlet and outlet ports $a'$. The meter drives a pinion $a^2$ which engages a gear $b$ of a suitable transmission mechanism. Recorders $c$ and $c'$ are carried in a housing $c^2$ and include the usual mechanism for recording the quantity of fluid metered in accordance with given conditions. The recorders are provided with driving clutches $c^3$ and $c^4$, respectively, the clutches being engaged by cooperating clutches of a transmission to be described presently.

Pivoted upon a bracket $c^5$ is a walking beam $b'$, either end thereof mounting vertical shafts $b^2$ and $b^3$, respectively. The shaft $b^2$ carries gear $b$ at the lower extremity thereof and a gear $b^4$ provided with clutch elements $b^5$ for engaging the clutch $c^3$. Shaft $b^3$ carries a gear $b^6$ which is provided with clutch elements $b^7$ for engaging the clutch $c^4$. Gears $b^4$ and $b^6$ are connected for simultaneous rotation by a gear $d$ which is mounted upon a bracket $c^5$ within the housing $c^2$. Gears $b^4$ and $b^6$ are in constant engagement with the gear $d$ regardless of the pivotal movement of the walking beam $b'$, and gear $b$ is likewise in constant engagement with the driving pinion $a^2$ regardless of such movement.

Within a housing $e$, a timing mechanism $e'$ is enclosed, the mechanism driving a suitable dial $e^2$, upon the periphery of which a cam $e^3$ is formed. The dial is preferably calibrated to indicate the twenty-four hours of a day and is driven one revolution in twenty-four hours. The cam extends through that portion of the periphery of the dial which corresponds to the period of the day for which the amount of fluid used is desired to be known. Engaging the periphery of the dial, is a roller $f$ mounted upon a pivoted arm $f'$ which is provided with a leaf spring $f^2$ to engage the lower extremity of shaft $b^3$.

As the dial rotates and the cam $e^3$ moves under the roller $f$, the arm $f'$ will be raised and the walking beam $b'$ moved to engage clutch elements $b^7$ and $c^4$ and disengage clutch elements $b^5$ and $c^3$. During that period of the day which cam $e^3$ engages roller $f$, the recording mechanism $c'$ will indicate the fluid used. During the remainder of the day, when roller $f$ is riding over the remainder of the periphery of the disc $e^2$ the recording mechanism $c$ will indicate the amount of fluid used.

Minor details in the design and arrangement of parts may be made without departing from the scope of the invention as defined in the appended claim.

I claim as my invention:

In actuating mechanism for meters having a plurality of registers, a timing mechanism, driving clutch elements carried by the registers, a walking beam, a gear carried at one end of the walking beam and driven by the meter, a clutch on the gear cooperating with one of the driving clutches, a second gear mounted on a fixed element and engaging the first gear, a third gear mounted upon the other end of the walking beam and engaging the second gear, a clutch on the third gear cooperating with another of the driving clutches, and time controlled means for tilting the walking beam to engage the cooperating clutch elements selectively.

This specification signed this 28th day of August, A. D. 1928.

WILLIAM L. MARDEN.